United States Patent
Carsello et al.

[11] Patent Number: 5,974,100
[45] Date of Patent: Oct. 26, 1999

[54] METHOD AND APPARATUS IN A COMMUNICATION RECEIVER FOR COMPENSATING FOR CHANNEL AMPLITUDE AND PHASE DISTORTION

[75] Inventors: Stephen Rocco Carsello, Fort Worth; Metin Bayram, Bedford, both of Tex.

[73] Assignee: Motorola, Inc., Schaumburg, Ill.

[21] Appl. No.: 08/978,552

[22] Filed: Nov. 26, 1997

[51] Int. Cl.[6] .............................. H03D 1/04; H03K 5/01; H04B 1/10; H04L 1/00

[52] U.S. Cl. .......................... 375/346; 375/350; 455/296; 455/63

[58] Field of Search ...................... 375/346, 350, 375/284, 285; 708/300, 303, 306, 312, 313; 455/278.1, 277.2, 296, 306, 501, 63

[56] References Cited

U.S. PATENT DOCUMENTS

| | | | |
|---|---|---|---|
| 5,414,734 | 5/1995 | Marchetto et al. | 375/267 |
| 5,529,071 | 6/1996 | Foster | 128/660.07 |
| 5,809,083 | 9/1998 | Wright | 375/285 |
| 5,812,600 | 9/1998 | Hess et al. | 375/261 |

*Primary Examiner*—Stephen Chin
*Assistant Examiner*—Phuong Phu
*Attorney, Agent, or Firm*—R. Louis Breeden

[57] ABSTRACT

A radio signal is digitized and filtered to derive a digitized pilot signal (210) modulated by channel amplitude and phase distortion. A numerator and a denominator are formed for dividing the digitized radio signal (208) by the digitized pilot signal, the numerator and the denominator requiring a first predetermined number of bits per sample. The bits of the numerator and the denominator are shifted (518) by equal amounts until a highest order bit of one of the numerator and the denominator is non-zero. A second predetermined number of highest order bits of the numerator are divided (524) by the second predetermined number of highest order bits of the denominator in a divider utilizing less than the first predetermined number of bits, to generate a channel compensated radio signal (536) having a minimum number of bits that can accommodate a predetermined maximum dynamic range.

15 Claims, 3 Drawing Sheets

METHOD AND APPARATUS IN A COMMUNICATION RECEIVER FOR COMPENSATING FOR CHANNEL AMPLITUDE AND PHASE DISTORTION

FIELD OF THE INVENTION

This invention relates in general to communication receivers, and more specifically to a method and apparatus in a communication receiver for compensating for channel amplitude and phase distortion.

BACKGROUND OF THE INVENTION

Mobile radio systems encounter amplitude and phase fluctuations associated with the mobile radio channel. Consider the complex envelope representation of a transmitted signal $$s(t)=p+m_1(t)+m_2(t)+j\{\hat{m}_2(t)-\hat{m}_1(t)\},$$

where p is the pilot tone at channel center (i.e., DC in the case of complex baseband representation), $m_1(t)$ and $m_2(t)$ are the upper and lower sideband messages, respectively, and $\hat{m}$ denotes the Hilbert transform of m. The mobile radio channel imposes distortion on the transmitted signal—most notably, Rayleigh fading, which can be modeled as a multiplicative random process $$r(t)=A(t)e^{j\Theta(t)}s(t)=pA(t)e^{j\Theta(t)}+A(t)e^{j\Theta(t)}(m_1(t)+m_2(t)+j\{\hat{m}_2(t)-\hat{m}_1(t)\})$$

where A(t) is a Rayleigh-distributed envelope process and $\Theta(t)$ is a uniformly-distributed phase shift. This distortion imposes difficulties in recovering the message information contained in the transmitted signal and should be removed or compensated for best results.

Prior art techniques for compensating for channel distortion have required an undesirably large amount of memory storage and processing power to achieve sufficient accuracy of compensation. This has resulted in increased receiver cost and higher than necessary power consumption—an undesirable characteristic in battery powered devices, such as portable selective call receivers.

Thus, what is needed is a method and apparatus in a communication receiver for compensating for channel amplitude and phase distortion. The method and apparatus preferably will operate in a manner that maximizes computational accuracy while minimizing memory storage requirements and processing power.

SUMMARY OF THE INVENTION

An aspect of the present invention is a method in a communication receiver for compensating for channel amplitude and phase distortion in a radio signal comprising an amplitude modulated transmission including a pilot signal, the communication receiver having a predetermined maximum dynamic range for the radio signal after channel compensation. The method comprises the steps of digitizing the radio signal, thereby generating a digitized radio signal; and filtering the digitized radio signal to derive a digitized pilot signal modulated by the channel amplitude and phase distortion. The method further comprises the steps of forming a numerator and a denominator for dividing the digitized radio signal by the digitized pilot signal, wherein the numerator and the denominator require a first predetermined number of bits per sample; and shifting the bits of the numerator and the denominator by equal amounts until a highest order bit of one of the numerator and the denominator is non-zero. The method further comprises the step of dividing a second predetermined number of highest order bits of the numerator by the second predetermined number of highest order bits of the denominator in a divider utilizing less than the first predetermined number of bits, to generate a channel compensated radio signal having a minimum number of bits that can accommodate the predetermined maximum dynamic range.

Another aspect of the present invention is an apparatus for use in a communication receiver for compensating for channel amplitude and phase distortion in a radio signal comprising an amplitude modulated transmission including a pilot signal, the communication receiver having a predetermined maximum dynamic range for the radio signal after channel compensation. The apparatus comprises a digitizing means for digitizing the radio signal, thereby generating a digitized radio signal; and a filter means coupled to the digitizing means for filtering the digitized radio signal to derive a digitized pilot signal modulated by the channel amplitude and phase distortion. The apparatus further comprises a forming means coupled to the digitizing means and coupled to the filter means for forming a numerator and a denominator for dividing the digitized radio signal by the digitized pilot signal, wherein the numerator and the denominator require a first predetermined number of bits per sample; and a shift means coupled to the forming means for shifting the bits of the numerator and the denominator by equal amounts until a highest order bit of one of the numerator and the denominator is non-zero. The apparatus further comprises a divider means coupled to the shift means for dividing a second predetermined number of highest order bits of the numerator by the second predetermined number of highest order bits of the denominator, the divider means utilizing less than the first predetermined number of bits, to generate a channel compensated radio signal having a minimum number of bits that can accommodate the predetermined maximum dynamic range.

Another aspect of the present invention is a communication receiver for compensating for channel amplitude and phase distortion in a radio signal comprising an amplitude modulated transmission including a pilot signal, the communication receiver having a predetermined maximum dynamic range for the radio signal after channel compensation. The communication receiver comprises a receiver element for receiving the radio signal, and a processing system coupled to the receiver element for processing the radio signal. The communication receiver further comprises a user interface coupled to the processing system for conveying information carried in the radio signal to a user. The processing system is programmed to digitize the radio signal, thereby generating a digitized radio signal; and to filter the digitized radio signal to derive a digitized pilot signal modulated by the channel amplitude and phase distortion. The processing system is further programmed to form a numerator and a denominator for dividing the digitized radio signal by the digitized pilot signal, wherein the numerator and the denominator require a first predetermined number of bits per sample; and to shift the bits of the numerator and the denominator by equal amounts until a highest order bit of one of the numerator and the denominator is non-zero. The processing system is also programmed to divide a second predetermined number of highest order bits of the numerator by the second predetermined number of highest order bits of the denominator in a divider utilizing less than the first predetermined number of bits, to generate a channel compensated radio signal having a minimum number of bits that can accommodate the predetermined maximum dynamic range.

DETAILED DESCRIPTION OF THE DRAWINGS

Figure 1:
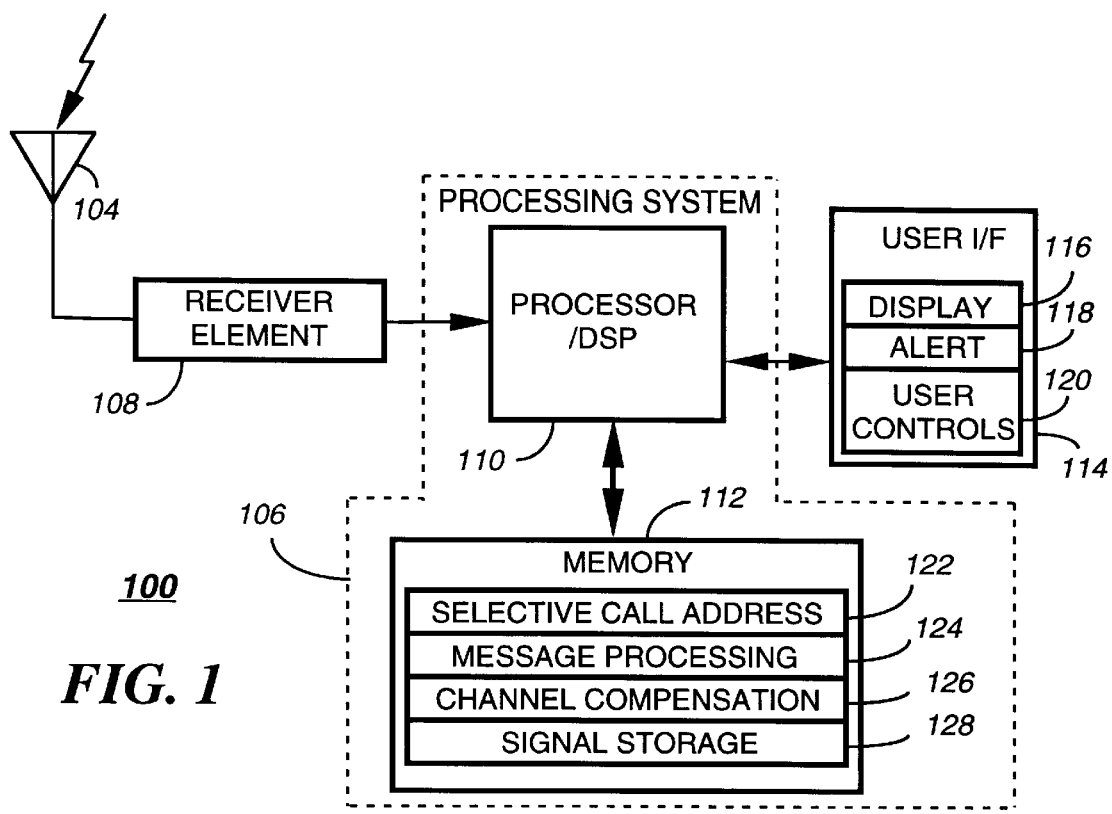
FIG. 1 is an exemplary electrical block diagram of a communication receiver in accordance with the present invention.

FIG. 1 is an exemplary electrical block diagram of a communication receiver 100 in accordance with the present invention. The communication receiver 100 comprises an antenna 104 for intercepting a radio signal preferably including an amplitude modulated (AM) transmission including a pilot signal, such as a pilot tone or a sequence of pilot symbols. The AM transmission preferably is a single sideband transmission. Alternatively, the transmission can be a double sideband AM transmission, or a quadrature amplitude modulated (QAM) transmission. The communication receiver 100 further comprises a conventional receiver element 108 coupled to the antenna 104 for receiving the radio signal and preferably down-converting the radio signal to baseband. The receiver element 108 is coupled to a processing system 106 for processing the radio signal in accordance with the present invention. In addition, a conventional user interface 114 is coupled to the processing system 106 for providing, to a user, information derived from the radio signal, as well as for providing control of the communication receiver 100 by the user. The user interface 114 preferably comprises a conventional display 116, such as a liquid crystal display, and a conventional alert element 118 for alerting the user when a message is received. The user interface 114 also includes conventional user controls 120 for controlling the communication receiver 100.

The processing system 106 comprises a processor 110, preferably a digital signal processor (DSP) selected from the 56800 family of DSPs manufactured by Motorola, Inc. for digitizing and processing the radio signal. The processing system 106 further comprises a memory 112 for programming the processing system 106 in accordance with the present invention and for storing variables utilized during the processing of the radio signal. The operational features of the processing system 106 in accordance with the present invention preferably are implemented in the processor 110 and the memory 112 executing software readily written by one of ordinary skill in the art, given the teachings of the instant disclosure. It will be appreciated that, alternatively, some or all of the operational features of the processing system 106 can be implemented in hardware, as well.

The memory 112 comprises a selective call address 122 to which the communication receiver 100 is responsive. The memory further comprises a message processing element 124 for programming the processing system 106 to process messages received in the radio signal through well-known techniques. In addition, the memory 112 comprises a channel compensation element 126 for programming the processing system 106 to compensate for channel distortion in accordance with the present invention. The memory 112 also includes signal storage space 128 for storing samples of the radio signal during processing by the processing system 106. To conserve memory space and processing power, the bit width of the signal storage space 128 is preferably kept to the minimum that will meet the dynamic range requirements of the communication receiver 100, e.g., 8 bits per sample.

Figure 2:
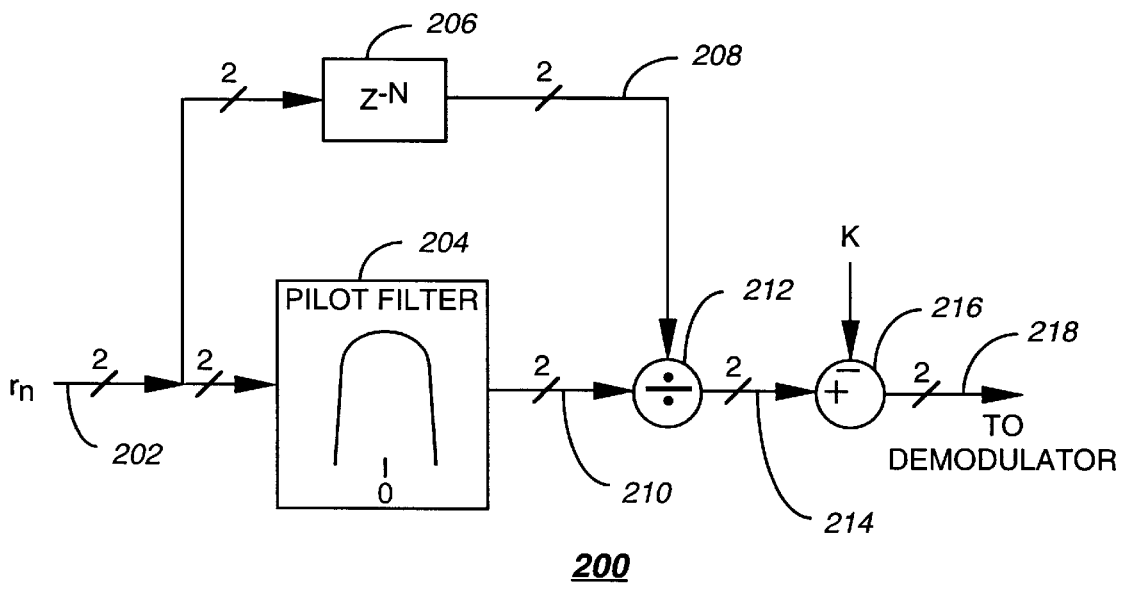
FIG. 2 is an exemplary electrical block diagram of a first amplitude and phase compensation circuit in accordance with the present invention.

FIG. 2 is an exemplary electrical block diagram of a first amplitude and phase compensation circuit 200 in accordance with the present invention. The circuit 200 preferably applies when the pilot signal comprises a continuously transmitted pilot tone. The circuit 200 depicts functions that preferably are performed by the processing system 106, and is shown to help explain the processes taking place internal to the processing system 106 after the radio signal is digitized. The circuit 200 receives complex baseband samples of the digitized radio signal at an input 202. The digitized radio signal is filtered by a pilot filter 204 to derive a digitized pilot signal, modulated by the channel amplitude and phase distortion, at a filter output 210. The digitized radio signal also is delayed in a delay element 206 preferably having a delay equal to the delay of the pilot filter 204. The delayed digitized radio signal at a delay element output 208 is then divided in a divider 212 by the digitized pilot signal, modulated by the channel amplitude and phase distortion, at the filter output 210. The result is a recovered digitized radio signal, without the channel amplitude and phase distortion, plus a DC component resulting from the baseband pilot tone at a divider output 214. The recovered digitized radio signal is then coupled to a subtracter 216 for removal of the DC component. The compensated output 218 is coupled to a conventional demodulator (not shown) for demodulating the recovered digitized radio signal using well-known techniques.

In slightly more detail, since multiplication in the time domain corresponds to convolution in the frequency domain, the received signal is spread in frequency by the mobile radio channel. Thus, when the pilot filter 204 is utilized to recover the digitized pilot signal, the pilot filter bandwidth preferably is kept wide enough to contain the pilot signal which is spread by, for example, ±100 Hz, but narrow enough to keep the sidebands from contributing to the pilot signal estimate. Given the received signal $$pA(t)e^{j\Theta(t)} + A(t)e^{j\Theta(t)}(m_1(t)+m_2(t)+j\{\hat{m}_2(t)-\hat{m}_1(t)\}),$$

assuming that the pilot filter 204 extracts the term $pA(t)e^{j\Theta(t)}$ perfectly, and given a pilot filter delay of N samples, a complex divide of the digitized radio signal, delayed N samples, by the pilot filter output inverts the channel function and removes the amplitude and phase distortion of the channel, thereby perfectly reconstructing the transmitted signal.

Pilot amplitude and phase compensation utilizes a division operator, which is problematic for the following reasons: (1) Care must be taken so that the division operator provides enough headroom for signal peaking in the compensated output. (2) At instances when adequate headroom is not available, the result should saturate rather than overflow. (3) At instances where the pilot signal experiences deep fades, precision should be preserved in the numerator and denominator signals.

The following section describes methods for ensuring robust performance of the division operation for either DSP software or custom digital hardware implementation for an exemplary voice messaging application. In particular, a novel method for preserving precision in the case of deep signal fading is described.

The phase and gain compensation is implemented by the processing system 106 by forming a numerator and a denominator for a complex division:

$$S_R + jS_I = \frac{I + jQ}{P_R + jP_I} = \frac{(I + jQ) \times (P_R - jP_I)}{P_R^2 + P_I^2},$$

where I+jQ is the output of the delay element 206 and $P_R+jP_I$ is the output of the pilot filter 204. The implementation of the complex multiplication in the numerator is straightforward $$I \times P_R + Q \times P_I + j(Q \times P_R - P_I).$$

However, the division operation must ensure that the transmitted signal is recovered with minimal distortion while achieving the best possible signal-to-noise ratio. In order to prevent saturation when performing the division, an assumption must be made as to what is the peak subchannel level relative to the pilot level. To account for peaks in the composite signal I+jQ, the numerator is shifted to the right by four bits before dividing by the denominator. Saturation in the divide is avoided as long as the following condition is met:

$$\left| \frac{(I + jQ) \times (P_R - jP_I) \gg 4}{P_R^2 + P_I^2} \right| < 1,$$

where ">>4" implies an arithmetic right shift of four bits, i.e., division by $2^4=16$. It follows that saturation is prevented if $$\frac{|I + jQ|}{|P_R + jP_I|} < 16,$$

and, assuming, for example, that the pilot power is approximately equal to one-third of the total subchannel power, this suggests that saturation is avoided if the subchannel peak-to-average power satisfies $$\frac{\sqrt{P_{peak}}}{\sqrt{P_{avg}/3}} < 16 \Longrightarrow 10 \log \frac{P_{peak}}{P_{avg}} < 19 \text{ dB},$$

which is more than enough margin to account for peaks in the transmitted signal.

The division itself is designed to achieve at least 8 bits of resolution in its result, where approximately three bits are allocated for voice peaking above the average voice level (19 dB peak-to-average, 6 dB per bit). However, since the arguments into the divide routine are products of, for example, 16 bit numbers, their "energy" may occupy anywhere from 1 to 32 bits.

Figure 3:
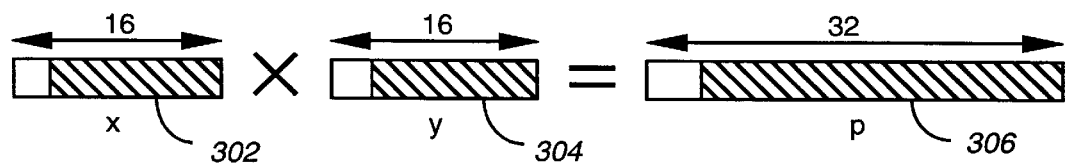
FIG. 3 is an exemplary diagram depicting contents of factor and product registers for strong signal levels in accordance with the present invention.
Figure 4:
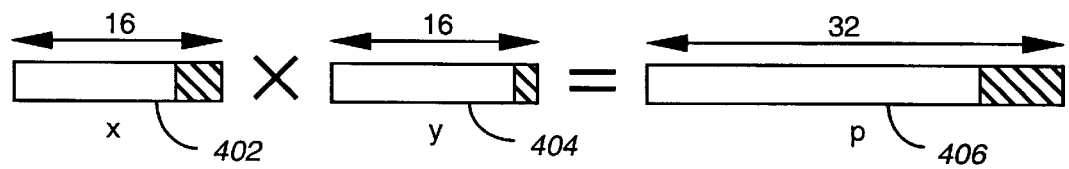
FIG. 4 is an exemplary diagram depicting contents of factor and product registers for weak signal levels in accordance with the present invention.

FIG. 3 is an exemplary diagram 300 depicting contents of factor registers 302, 304 and a product register 306 for strong signal levels in accordance with the present invention. FIG. 4 is an exemplary diagram 400 depicting contents of factor registers 402, 404 and a product register 406 for weak signal levels in accordance with the present invention. Shaded areas of the diagrams 300, 400 start with the most significant (i.e., leftmost) "non-sign-extension" bit of the register contents. Note that, for strong signals, the product energy resides mostly in the upper 16 bits of the product register 306. However, for weak signals, most of the energy in the product resides in the lower 16 bits of the product register 406. Thus, to achieve good precision across all ranges of possible signal levels, the divide routine must accept 32-bit inputs. A full 32 by 32 bit division with 32-bit result is wasteful, however, since the result may only need to be 8 bits wide. For example, the signal storage space 128 of the memory 112 may require fewer bits, e.g., 8 bits, to meet the dynamic range requirements of the communication receiver 100.

Figure 5:
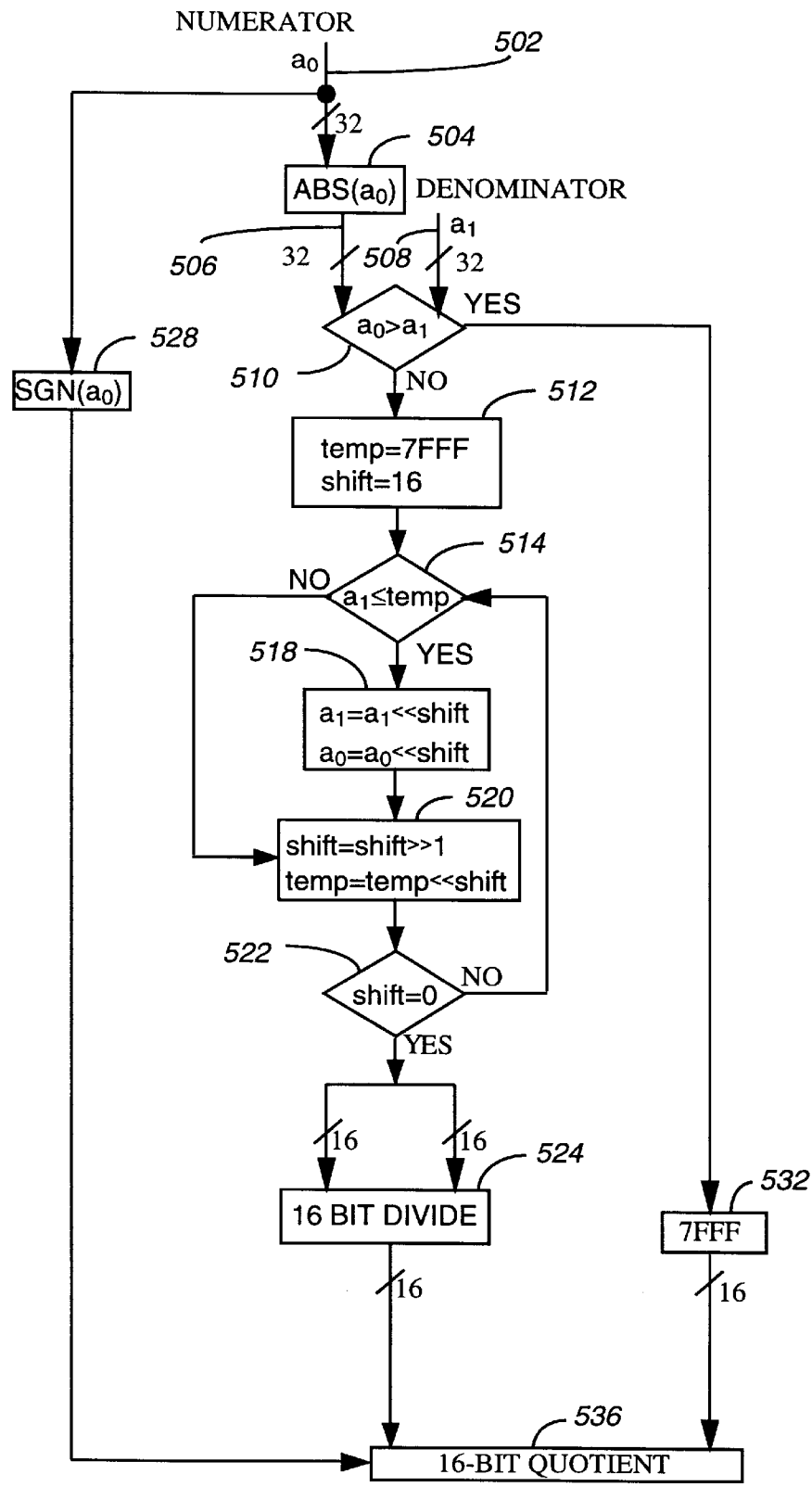
FIG. 5 is an exemplary flow diagram depicting operation of a processing system of the communication receiver in accordance with the present invention.

FIG. 5 is an exemplary flow diagram 500 depicting operation of the processing system 106 in accordance with the present invention. It will be appreciated that the flow diagram 500 operates twice per sample, one time for each of the real and imaginary parts of the signal sample. The diagram 500 depicts a process for achieving a result having a 16 bit precision. If lower precision (e.g., 8 bit precision) is required, only a portion, e.g., 8, of the most significant bits of the result can be used. Two 32-bit values, $a_0$ (the numerator) and $a_1$ (the denominator), are accepted at inputs 502 and 508, respectively. A divide routine 524 accepts 16-bit inputs to give a 16-bit result, and requires that the numerator and denominator be positive. An absolute value 504 is applied to the numerator $a_0$ and its sign is kept 528 for later application to the quotient 536, whereas the denominator is guaranteed to be positive and is left alone. Also, the numerator must be smaller than the denominator to prevent overflow. This is tentatively ensured with the right-shift-by-four described earlier; however, if at step 510 for any reason the numerator is larger than the denominator, the algorithm gives a result 532 of either −1 or 1, depending on the sign of the numerator (1=7FFF for the purpose of this description). In addition, it is desirable to capture the most precision from the 32-bit input values. This is accomplished in steps 512, 514, 518, 520, and 522 by applying successive shifts to the numerator and denominator values until the highest order bit of the denominator is non-zero. Preferably, shifts are attempted by 16, 8, 4, 2, and 1 bit positions. Any shift between 1 and 31 can be performed with a combination of these numbers. The processor loading is advantageously reduced by more than a factor of 5, compared to a simple technique of shifting one bit position at a time. For a hardware implementation, either the number of clock cycles, or the number of logic gates is advantageously reduced.

In somewhat more detail, if at step 510 the numerator is not greater than the denominator, then the processing system 106 assigns 512 first and second predetermined initial values, e.g., 7FFF and 16, to a temporary value and a shift value. The processing system 106 then compares 514 the denominator with the temporary value to determine whether the denominator is no greater than the temporary value. If so, the processing system left-shifts 518 both the numerator and the denominator by an amount equal to the shift value. This is equivalent to multiplying the numerator and the denominator by a factor of two raised to a power equal to the shift value. In any event, whether or not the denominator is no greater than the temporary value in step 514, the processing system then right-shifts 520 the shift value by one bit position and then left-shifts the temporary value by the new shift value. This is equivalent to dividing the shift value by two to form a new shift value, and then multiplying the temporary value by a factor of two raised to the new shift value to form a new temporary value. The processing system 106 then tests 522 whether the shift value has reached a predetermined limit, e.g., zero. If not, the flow returns to step 514 to repeat the process until reaching the predetermined limit. Then the flow continues to step 524 to perform a sixteen-bit divide, utilizing the sixteen most significant bits of the (shifted) numerator and denominator. It will be appreciated that if a lower precision result is required, fewer bits, e.g., the eight most significant bits of the numerator and the denominator, can be divided using a smaller, e.g., 8-bit, divider. Flow then moves to step 536, where the sign of the numerator is applied to the division result to derive the quotient, representing the channel compensated radio signal.

Under certain channel conditions a very low level pilot signal value can exist, making the present invention particularly advantageous. One such channel condition is one in which in addition to the desired sub-channel there is an interfering adjacent sub-channel, and both signals experience independent Rayleigh fading. If the power of the adjacent sub-channel is greater than that of the desired channel, the automatic gain control (AGC) of the communication receiver 100 can lock onto the interfering adjacent sub-channel. This way, any deep fades the desired pilot signal experiences will not be accounted for by the AGC, and very low signal levels for the pilot magnitude will occur. Simulations have shown that the pilot signal magnitude can fall as low as 50 dB below nominal in deep fades, and values of 20 to 30 dB below nominal are frequent. Such deep fades require the high resolution division provided by the present invention to accurately compensate the channel distortions.

Figure 6:
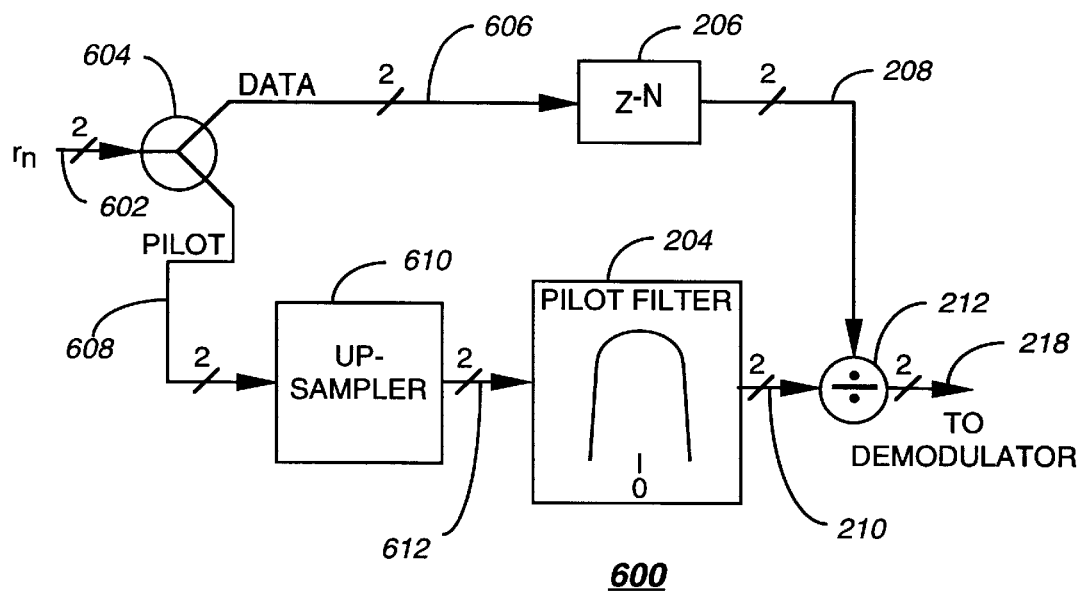
FIG. 6 is an exemplary electrical block diagram of a second amplitude and phase compensation circuit in accordance with the present invention.

FIG. 6 is an exemplary electrical block diagram of a second amplitude and phase compensation circuit 600 in accordance with the present invention. The circuit 600 preferably applies when the pilot signal comprises a sequence of pilot symbols, as is the case in, for example, a pilot symbol assisted QAM system. As with the circuit 200, the circuit 600 depicts functions that preferably are performed by the processing system 106, and is shown to help explain the processes taking place internal to the processing system 106 after the radio signal is digitized. The circuit 600 is similar to the circuit 200, and operates in a similar manner to compensate the channel distortions. An essential difference is the addition of a conventional splitter 604 coupled to the input 602 comprising both data symbol samples and pilot symbol samples for splitting the data symbol samples onto a first path 606 to the delay element 206 and the pilot symbol samples onto a second path 608 to a conventional up-sampler 610. Another essential difference is the addition of the up-sampler 610 for bringing the pilot symbol rate up to the data symbol rate at an up-sampler output 612 coupled to the pilot filter 204 for interpolating the pilot symbol sequence using well-known techniques. A third essential difference is the elimination of the subtracter 216 of FIG. 2. The subtracter 216 is not needed in the circuit 600, because there is no pilot tone present in the data samples when a pilot symbol sequence is used instead of a pilot tone. Otherwise, the pilot filter 204, the delay element 206 and the divider 212 operate as described herein above in accordance with the present invention.

Thus, it should be clear from the preceding disclosure that the present invention provides a method and apparatus in a communication receiver for compensating for channel amplitude and phase distortion. The method and apparatus advantageously operates in a manner that maximizes computational accuracy while minimizing memory storage requirements and processing power.

Many modifications and variations of the present invention are possible in light of the above teachings. For example, the numerator and the denominator can be exchanged in the tests of steps 510 and 514 for an alternative embodiment in which the numerator is required to be larger than the denominator. Fewer or more bits can be used in the factor registers 302, 304, 402, 404 and the product registers 306, 406, and in the divide step 524. Many other variations will occur to one of ordinary skill in the art, given the teachings of the preceding disclosure. Thus, it is to be understood that, within the scope of the appended claims, the invention can be practiced other than as described herein above for the exemplary embodiments.

What is claimed is:

1. A method in a communication receiver for compensating for channel amplitude and phase distortion in a radio signal comprising an amplitude modulated transmission including a pilot signal, the communication receiver having a predetermined maximum dynamic range for the radio signal after channel compensation, the method comprising the steps of:

digitizing the radio signal, thereby generating a digitized radio signal;

filtering the digitized radio signal to derive a digitized pilot signal modulated by the channel amplitude and phase distortion;

forming a numerator and a denominator for dividing the digitized radio signal by the digitized pilot signal, wherein the numerator and the denominator require a first predetermined number of bits per sample;

shifting bits of the numerator and the denominator by equal amounts until a highest order bit of one of the numerator and the denominator is non-zero; and dividing a second predetermined number of highest order bits of the numerator by the second predetermined number of highest order bits of the denominator in a divider utilizing less than the first predetermined number of bits, to generate a channel compensated radio signal having a minimum number of bits that can accommodate the predetermined maximum dynamic range.

2. The method of claim 1, wherein the pilot signal comprises a pilot tone, and wherein the filtering step comprises the step of filtering the digitized radio signal to derive a digitized pilot signal modulated by the channel amplitude and phase distortion.

3. The method of claim 1, wherein the pilot signal comprises a pilot symbol sequence, and wherein the filtering step comprises the step of interpolating the pilot symbol sequence to derive a digitized pilot signal modulated by the channel amplitude and phase distortion.

4. The method of claim 1, wherein the shifting step comprises the steps of:

assigning first and second predetermined initial values to a temporary value and a shift value;

comparing a value of one of the numerator and the denominator with the temporary value;

thereafter dividing the shift value by two to form a new shift value;

thereafter multiplying the temporary value by a factor of two raised to the new shift value to form a new temporary value; and repeating the comparing, dividing and multiplying steps until reaching a predetermined limit of the shift value.

5. The method of claim 4, wherein the comparing step comprises the step of determining whether the value of the one of the numerator and the denominator is greater than the temporary value, and wherein the method further comprises the step of multiplying the numerator and the denominator by two raised to a power equal to the shift value, in response to the one of the numerator and the denominator being no greater than the temporary value.

6. An apparatus for use in a communication receiver for compensating for channel amplitude and phase distortion in a radio signal comprising an amplitude modulated transmission including a pilot signal, the communication receiver having a predetermined maximum dynamic range for the radio signal after channel compensation, the apparatus comprising:

digitizing means for digitizing the radio signal, thereby generating a digitized radio signal;

filter means coupled to the digitizing means for filtering the digitized radio signal to derive a digitized pilot signal modulated by the channel amplitude and phase distortion;

forming means coupled to the digitizing means and coupled to the filter means for forming a numerator and a denominator for dividing the digitized radio signal by the digitized pilot signal, wherein the numerator and the denominator require a first predetermined number of bits per sample;

shift means coupled to the forming means for shifting bits of the numerator and the denominator by equal amounts until a highest order bit of one of the numerator and the denominator is non-zero; and divider means coupled to the shift means for dividing a second predetermined number of highest order bits of the numerator by the second predetermined number of highest order bits of the denominator, the divider means utilizing less than the first predetermined number of bits, to generate a channel compensated radio signal having a minimum number of bits that can accommodate the predetermined maximum dynamic range.

7. The apparatus of claim 6, wherein the pilot signal comprises a pilot tone, and wherein the filter means is arranged for filtering the digitized radio signal to derive a digitized pilot signal modulated by the channel amplitude and phase distortion.

8. The apparatus of claim 6, wherein the pilot signal comprises a pilot symbol sequence, and wherein the filter means is arranged for interpolating the pilot symbol sequence to derive a digitized pilot signal modulated by the channel amplitude and phase distortion.

9. The apparatus of claim 6, wherein the shift means is arranged for:

assigning first and second predetermined initial values to a temporary value and a shift value;

comparing a value of one of the numerator and the denominator with the temporary value;

dividing the shift value by two to form a new shift value;

multiplying the temporary value by a factor of two raised to the new shift value to form a new temporary value; and continuing to compare, divide, and multiply until reaching a predetermined limit of the shift value.

10. The apparatus of claim 9, further comprising:

determining means for determining whether the value of the one of the numerator and the denominator is greater than the temporary value; and multiplier means coupled to the determining means for multiplying the numerator and the denominator by two raised to a power equal to the shift value, in response to the one of the numerator and the denominator being no greater than the temporary value.

11. A communication receiver for compensating for channel amplitude and phase distortion in a radio signal comprising an amplitude modulated transmission including a pilot signal, the communication receiver having a predetermined maximum dynamic range for the radio signal after channel compensation, the communication receiver comprising:

a receiver element for receiving the radio signal;

a processing system coupled to the receiver element for processing the radio signal; and a user interface coupled to the processing system for conveying information carried in the radio signal to a user, wherein the processing system is programmed to:

digitize the radio signal, thereby generating a digitized radio signal;

filter the digitized radio signal to derive a digitized pilot signal modulated by the channel amplitude and phase distortion;

form a numerator and a denominator for dividing the digitized radio signal by the digitized pilot signal, wherein the numerator and the denominator require a first predetermined number of bits per sample;

shift bits of the numerator and the denominator by equal amounts until a highest order bit of one of the numerator and the denominator is non-zero; and divide a second predetermined number of highest order bits of the numerator by the second predetermined number of highest order bits of the denominator in a divider utilizing less than the first predetermined number of bits, to generate a channel compensated radio signal having a minimum number of bits that can accommodate the predetermined maximum dynamic range.

12. The communication receiver of claim 11, wherein the pilot signal comprises a pilot tone, and wherein the processing system is further programmed to filter the digitized radio signal to derive a digitized pilot signal modulated by the channel amplitude and phase distortion.

13. The communication receiver of claim 11, wherein the pilot signal comprises a pilot symbol sequence, and wherein the processing system is further programmed to interpolate the pilot symbol sequence to derive a digitized pilot signal modulated by the channel amplitude and phase distortion.

14. The communication receiver of claim 11, wherein the processing system is further programmed to:

assign first and second predetermined initial values to a temporary value and a shift value;

compare a value of one of the numerator and the denominator with the temporary value;

divide the shift value by two to form a new shift value;

multiply the temporary value by a factor of two raised to the new shift value to form a new temporary value; and continue to compare, divide, and multiply until reaching a predetermined limit of the shift value.

15. The communication receiver of claim 14, wherein the processing system is further programmed to:

determine whether the value of the one of the numerator and the denominator is greater than the temporary value, and multiply the numerator and the denominator by two raised to a power equal to the shift value, in response to the one of the numerator and the denominator being no greater than the temporary value.

* * * * *